(12) United States Patent
Blount et al.

(10) Patent No.: US 9,519,549 B2
(45) Date of Patent: Dec. 13, 2016

(54) DATA STORAGE BACKUP WITH LESSENED CACHE POLLUTION

(75) Inventors: Lawrence Carter Blount, Tucson, AZ (US); Rahul Fiske, Pune (IN); Carl Evan Jones, Tucson, AZ (US); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 646 days.

(21) Appl. No.: 13/348,395

(22) Filed: Jan. 11, 2012

(65) Prior Publication Data
US 2013/0179637 A1    Jul. 11, 2013

(51) Int. Cl.
G06F 12/00     (2006.01)
G06F 13/00     (2006.01)
G06F 13/28     (2006.01)
G06F 11/14     (2006.01)

(52) U.S. Cl.
CPC ....... *G06F 11/1458* (2013.01); *G06F 11/1456* (2013.01); *G06F 2212/6024* (2013.01); *G06F 2212/6026* (2013.01)

(58) Field of Classification Search
CPC .............. G06F 11/1456; G06F 11/1458; G06F 2212/602; G06F 2212/6024; G06F 2212/6026; G06F 2212/6028
See application file for complete search history.

(56) References Cited

U.S. PATENT DOCUMENTS

| 5,305,389 A | * | 4/1994 | Palmer ..................... 382/305 |
| 5,535,381 A | * | 7/1996 | Kopper ..................... 710/52 |
| 5,694,568 A | * | 12/1997 | Harrison, III ........... G06F 9/383 711/137 |
| 5,754,888 A | * | 5/1998 | Yang ..................... G06F 3/0601 710/52 |
| 5,761,706 A | * | 6/1998 | Kessler et al. ............... 711/118 |
| 5,778,435 A | * | 7/1998 | Berenbaum .......... G06F 9/3806 711/137 |
| 5,960,454 A | * | 9/1999 | Mandal et al. ............... 711/118 |
| 6,081,875 A | * | 6/2000 | Clifton et al. ............... 711/162 |
| 6,105,111 A | * | 8/2000 | Hammarlund et al. ...... 711/136 |

(Continued)

OTHER PUBLICATIONS

Multiple prefetch adaptive disk caching, Grimsrud et al, IEEE Transactions on Knowledge and Data Engineering, vol. 5, iss. 1, Feb. 1993 (16 pages).*

(Continued)

*Primary Examiner* — Daniel C Chappell
(74) *Attorney, Agent, or Firm* — Griffiths & Seaton PLLC

(57) ABSTRACT

Control of the discard of data from cache during backup of the data. In a computer-implemented system comprising primary data storage; cache; backup data storage; and at least one processor, the processor is configured to identify data stored in the primary data storage for backup to the backup data storage, where the identified data is placed in the cache in the form of portions of the data, and where the portions of data are to be backed up from the cache to the backup storage. Upon backup of each portion of the identified data from the cache to the backup storage, the processor marks the backed up portion of the identified data for discard from the cache. Thus, the backed up data is discarded from the cache right away, lessening cache pollution.

12 Claims, 3 Drawing Sheets

(56) References Cited

U.S. PATENT DOCUMENTS

| | | | | |
|---|---|---|---|---|
| 6,134,643 | A * | 10/2000 | Kedem | G06F 12/0862 711/137 |
| 6,202,129 | B1 * | 3/2001 | Palanca et al. | 711/133 |
| 6,292,871 | B1 * | 9/2001 | Fuente | 711/136 |
| 6,516,388 | B1 * | 2/2003 | McCormick et al. | 711/136 |
| 6,584,547 | B2 * | 6/2003 | Palanca et al. | 711/133 |
| 6,711,651 | B1 * | 3/2004 | Moreno | G06F 12/0815 711/137 |
| 7,058,766 | B2 * | 6/2006 | Modha | 711/134 |
| 7,124,254 | B2 * | 10/2006 | Fahs | G06F 12/0862 711/141 |
| 7,191,207 | B2 * | 3/2007 | Blount et al. | 709/200 |
| 7,380,047 | B2 * | 5/2008 | Emma et al. | 711/3 |
| 7,805,572 | B2 * | 9/2010 | LeMire et al. | 711/118 |
| 8,019,811 | B1 | 9/2011 | Britto et al. | |
| 8,200,905 | B2 * | 6/2012 | Bell | G06F 12/0831 710/22 |
| 8,433,852 | B2 * | 4/2013 | Hu | G06F 12/0862 711/137 |
| 8,473,689 | B2 * | 6/2013 | Anderson | G06F 12/0862 711/137 |
| 8,533,422 | B2 * | 9/2013 | Subramaniam | G06F 9/3816 711/105 |
| 8,850,123 | B2 * | 9/2014 | Dubrovin | G06F 12/0862 710/14 |
| 9,058,277 | B2 * | 6/2015 | Bade | G06F 12/0862 |
| 9,058,278 | B2 * | 6/2015 | Kalamatianos | G06F 12/0862 |
| 9,304,928 | B2 * | 4/2016 | Udayashankar | G06F 12/0862 |
| 9,317,215 | B2 * | 4/2016 | Chen | G06F 3/065 |
| 9,348,755 | B2 * | 5/2016 | Boettiger | G06F 12/0862 |
| 2005/0138195 | A1 * | 6/2005 | Bono | G06F 17/30067 709/231 |
| 2011/0072218 | A1 | 3/2011 | Manne et al. | |
| 2015/0286571 | A1 * | 10/2015 | Cain, III | G06F 12/0862 711/123 |
| 2015/0378919 | A1 * | 12/2015 | Anantaraman | G06F 12/0862 711/122 |

OTHER PUBLICATIONS

Improving Instruction Cache Behavior by Reducing Cache Pollution , Gupta et al, Supercomputing '90 Proceedings of the 1990 ACM/IEEE conference on Supercomputing, 1990, pp. 82-91 (10 pages).*

Controlling Cache Pollution in Prefetching With Software-assisted Cache Replacement , Jain et al, Jul. 2001, retrieved from http://csg.csail.mit.edu/pubs/memos/Memo-462/memo-462.pdf on Jun. 17, 2014 (24 pages).*

Caching strategies to improve disk system performance, Karedia et al, Computer, vol. 27, iss. 3, Mar. 1994, pp. 38-46 (9 pages).*

SARC: Sequential Prefetching in Adaptive Replacement Cache, Gill et al, 2005 USENIX Annual Technical Conference, 2005, pp. 293-308 (16 pages).*

The IBM TotalStorage DS8000 Series: Concepts and Architecture, Warrick et al, Mar. 2005, retrieved from http://www.redbooks.ibm.com/redbooks/pdfs/sg246452.pdf on Jun. 8, 2015 (450 pages).*

Definition of subset; retrieved from http://study.com/academy/lesson/subsets-in-math-definition-examples-quiz.html on Mar. 28, 2016 (1 page).*

Proof of set being asubset of itself, "Solution: explain why every set is a subset of itself", retrieved from http://www.algebra.com/algebra/homework/real-numbers/real-numbers.faq.question.487462.html on Sep. 12, 2013 (1 page).*

Improving restore speed for backup systems that use inline chunk-based deduplication; Lillibridge et al; FAST'13 Proceedings of the 11th USENIX conference on File and Storage Technologies; Feb. 12, 2013; retrieved from https://www.usenix.org/system/files/conference/fast13/fast13-final124.pdf on Aug. 9, 2016 (15 pages).*

Combining Deduplication and Delta Compression to Achieve Low-Overhead Data Reduction on Backup Datasets; Xia et al; 2014 Data Compression Conference; Mar. 26-28, 2014; pp. 203-212 (10 pages).*

Prabhat Jain et al, Controlling Cache Pollution in Prefetching With Software-assisted Cache Replacement, CSAIL, Jul. 2001.

* cited by examiner

US 9,519,549 B2

DATA STORAGE BACKUP WITH LESSENED CACHE POLLUTION

FIELD OF THE INVENTION

This invention relates to data storage, and more particularly to conducting data storage backup.

BACKGROUND OF THE INVENTION

Data storage backup is mandatory in many data storage environments, and can be intensive in terms of resource requirements. Typically, backup applications read files/blocks only once, but at a very fast clip, which can cause cache pollution where the cache operates with standard discard techniques such as an LRU (least recently used) algorithm whereas the backup data is instead the most recently accessed. Further, when files are backed up it is difficult to know what the next file is and underlying prefetch algorithms tend to prefetch data based on the locality of reference, or are designed to cater to all I/O (input/output) requests, not matching the backup application since the data to be backed up may be dispersed randomly on the underlying storage.

SUMMARY OF THE INVENTION

Methods, data storage subsystems, and computer program products are provided for controlling the discard of data from cache during backup of the data.

In one embodiment of a computer-implemented system comprising primary data storage; cache; backup data storage; and at least one processor, the processor is configured to identify data stored in the primary data storage for backup to the backup data storage, where the identified data is placed in the cache in the form of portions of the data, such as blocks, and where the portions of data are to be backed up from the cache to the backup data storage. Upon backup of each portion of the identified data from the cache to the backup data storage, the processor marks the backed up portion of the identified data for discard from the cache.

Thus, the backed up data is discarded from the cache immediately after first access, lessening cache pollution.

In a further embodiment, the marking step of the processor comprises marking the identified backed up portions to an accelerated LRU (least recently used) list.

In another embodiment, the identifying step of the processor identifies in advance the subset of data stored in the data storage for backup.

In still another embodiment, the identifying step of the processor identifies a complete set of files of data stored in the data storage for the backup.

In a further embodiment, the portions of the backup and the marking step of the processor comprise data blocks.

In a still further embodiment, the backup comprises a backup access pattern, and the processor additionally prefetches the data blocks of the data storage for the backup for the caching in the order of the backup access pattern.

In a further embodiment, the identifying step of the processor additionally comprises generating a list of physical READS of the data stored in the data storage for the prefetching step and for the marking step.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
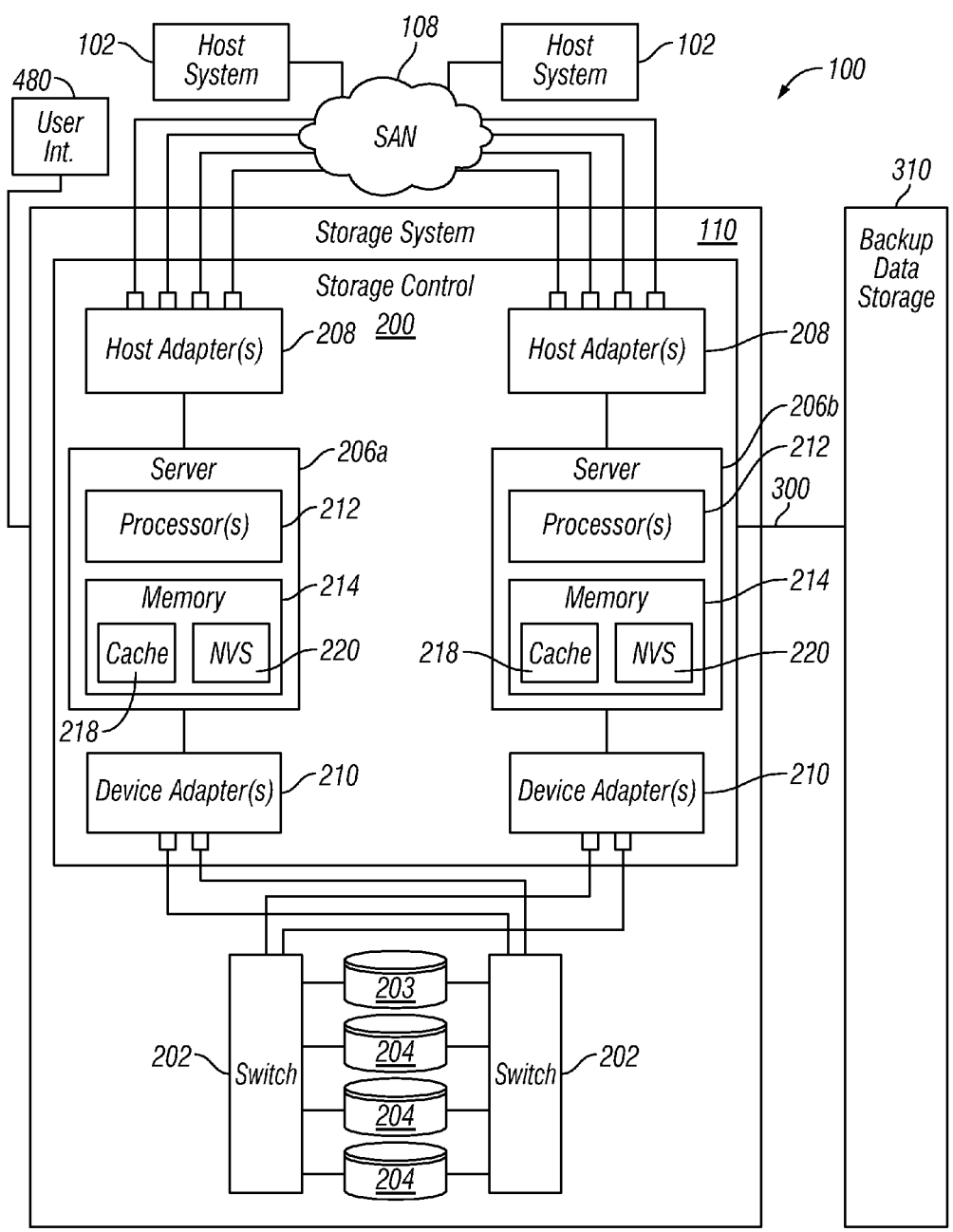
FIG. 1 is a block diagram of an exemplary computer-based storage architecture with a storage system and a backup storage system which may implement the present invention.

Referring to FIG. 1, an example of computer-based storage system architecture 100 is illustrated. The architectural arrangement comprises one of many which may implement the present invention. The system architecture 100 is presented only by way of example and is not intended to be limiting. The computer-implemented data storage system and methods disclosed herein may be applicable to a wide variety of different computers, servers, data storage systems, and storage architectures.

The exemplary storage system architecture 100 may comprise one or more host computer systems 102 coupled to one or more networks, such as a storage area network (SAN) 108, in turn coupled to a primary storage system 110 and backup data storage 310. The network 108 may comprise any suitable private or public interconnection using any suitable protocol. The primary storage system 110 comprises a storage control 200 configured to transfer data to and from and to control the operation of switches 202 and data storage 203 and 204. The data storage may comprise, for example, arrays of solid-state drives and hard disk drives accessible via switches 202. Alternatively or additionally, the data storage 203 and 204 may comprise individual devices or may comprise data storage libraries with many devices. All or any of the host systems 102 may direct and utilize the primary storage system 110 and utilize the storage control 200 and any data caching system therein.

The backup storage system 310 may comprise a storage system similar to that of primary storage system 110 or may comprise a different type of storage system such as a tape system.

As shown, the storage control 200 comprises one or more servers 206a, 206b. Each control 200 may also comprise host adapters 208 and device adapters 210 to provide the interfaces to connect the control 200 to host systems 102 and data storage 203 and 204, respectively. Multiple servers 206a, 206b may provide redundancy to ensure that data is always available to connected hosts 102. Thus, in storage system 110, should one server 206a fail, the other server 206b may remain functional to ensure that data transfer is able to continue between the host systems 102 and the data storage 203 and 204. This process may be referred to as "failover".

One example of a storage system 110 having an architecture similar to that illustrated in FIG. 1 is the DS8000™

Enterprise Storage Server of International Business Machines Corp. (IBM®). The DS8000™ is a high performance, high capacity storage control providing data storage that is designed to support continuous operations and implement virtualization of data storage, and is presented herein only by way of embodiment examples and is not intended to be limiting. Thus, the storage systems 110, 310 discussed herein are not limited to the DS8000™, but may be implemented in any comparable storage system, regardless of the manufacturer, product name, or components or component names associated with the system.

In the example of FIG. 1, each storage system server 206a, 206b may comprise one or more computer processors 212 and memory 214. The computer processors 212 may comprise internal processing and storage capabilities to store software modules such as application programs, that run on the processors and, inter alia, are used to access data in the data storage 203 and 204.

The memory 214 may comprise a cache 218. Whenever a host 102 accesses data from a storage system 110, for example in a read operation, the server 206a, 206b that performs the operation, for example reading data from storage 203 and 204 may save the data in its cache 218 in the event it may be required again. If the data is accessed again by a host 102, the server 206a, 206b may fetch the data from the cache 218 instead of fetching it from storage 203 and 204, saving both time and resources. Similarly, when a host system 102 performs a write, the server 206a, 206b may store, or host system 102 may direct that the data be stored, in cache 218 to be destaged to the storage 203 and 204 at a later time. When a write is stored in cache 218, the write may also be stored in non-volatile storage (NVS) 220 of the opposite server 206b, 206a so that the write can be recovered by the opposite server 206b, 206a in the event the first server 206a, 206b fails.

Referring to FIG. 1, each storage system 110, 310 may comprise both data storage 204, such as hard disk drives, and data storage 203, such as solid state drives (SSDs) based on flash memory. The input/output (I/O) performance of SSD drives or other types of solid state memory is typically far faster than the I/O performance of hard disk drives. Alternatively, the backup storage system 310 may comprise a tape-based storage system with or without a tape library.

Data storage systems additionally offer the user an interface with respect to the storage system, for example in the form of Command Line Interface (CLI) commands or with Graphical User Interface (GUI) commands at a user interface 480. While the depicted embodiment shows the user interface 480 residing at the storage control 200, in other embodiments, the user may interact with the storage systems via a host 102, etc.

The storage control 200 and backup data storage 310 are in communication via link 300. The link 300 may comprise any suitable communication link, examples of which comprise SCSI, Fiber optics, or direct.

The user, via the user interface 480 may supervise the usage of the data storage systems. In one embodiment, in response to a user request to back up data storage at storage system from the user interface 480, a backup application of processor(s) 212 of storage control 200 conducts the back up of data of data storage 203, 204 to the backup data storage 310 via link 300, using a cache 218.

Figure 2:
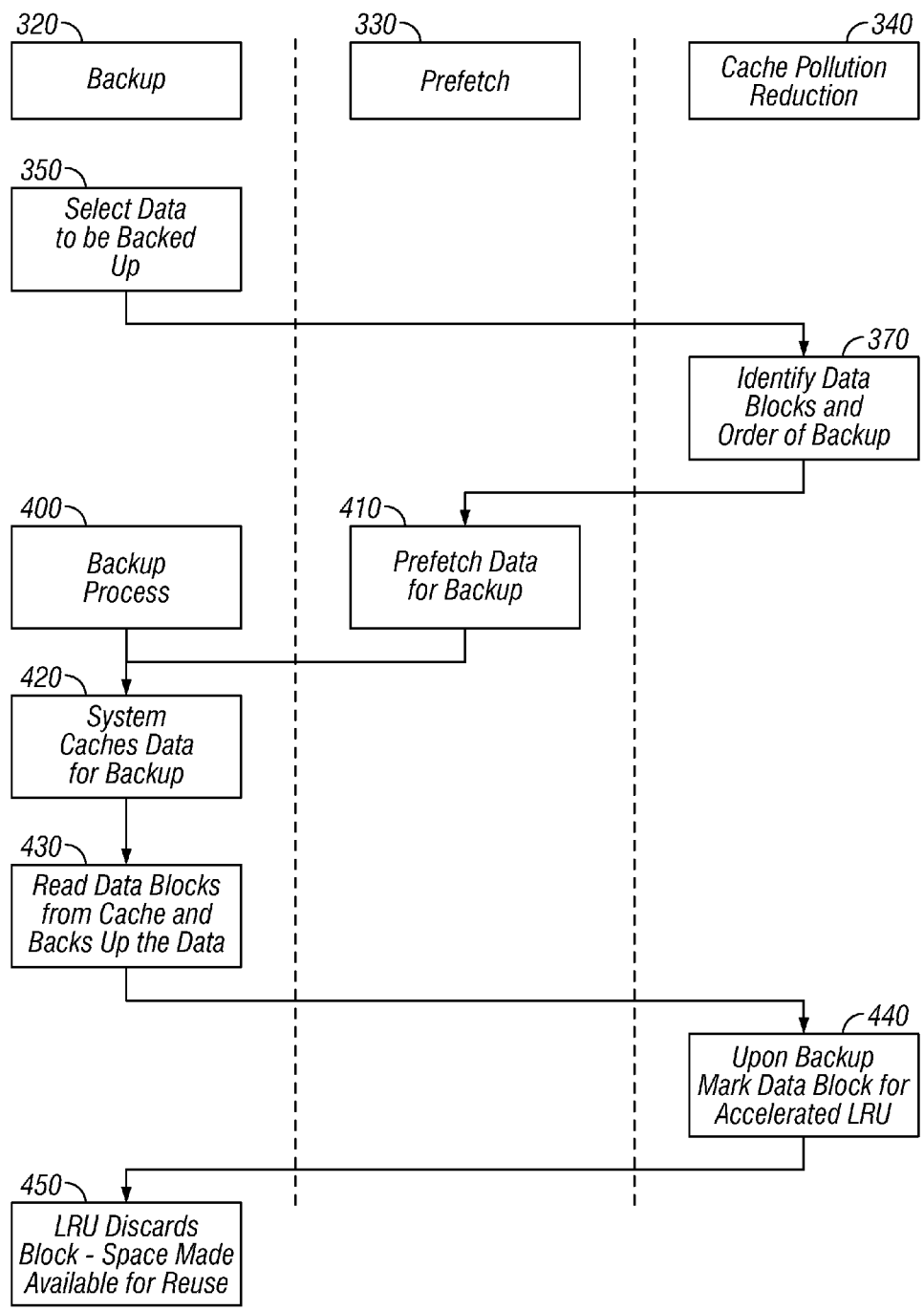
FIG. 2 is a diagrammatic illustration of various actions and states of the storage system and backup storage of FIG. 1.

Referring to FIGS. 1 and 2, the backup application may comprise a single combined application or a plurality of applications that work together. In one embodiment, the base backup application 320 is accompanied by a prefetch application 330 and a cache pollution reduction application 340.

The applications may be resident in processor(s) 212 as individual applications or as a single application. Alternatively, backup application 320 may be resident in host system 102 and the cache pollution reduction application 340 and prefetch application 330 may be resident in processor(s) 212.

Figure 3:
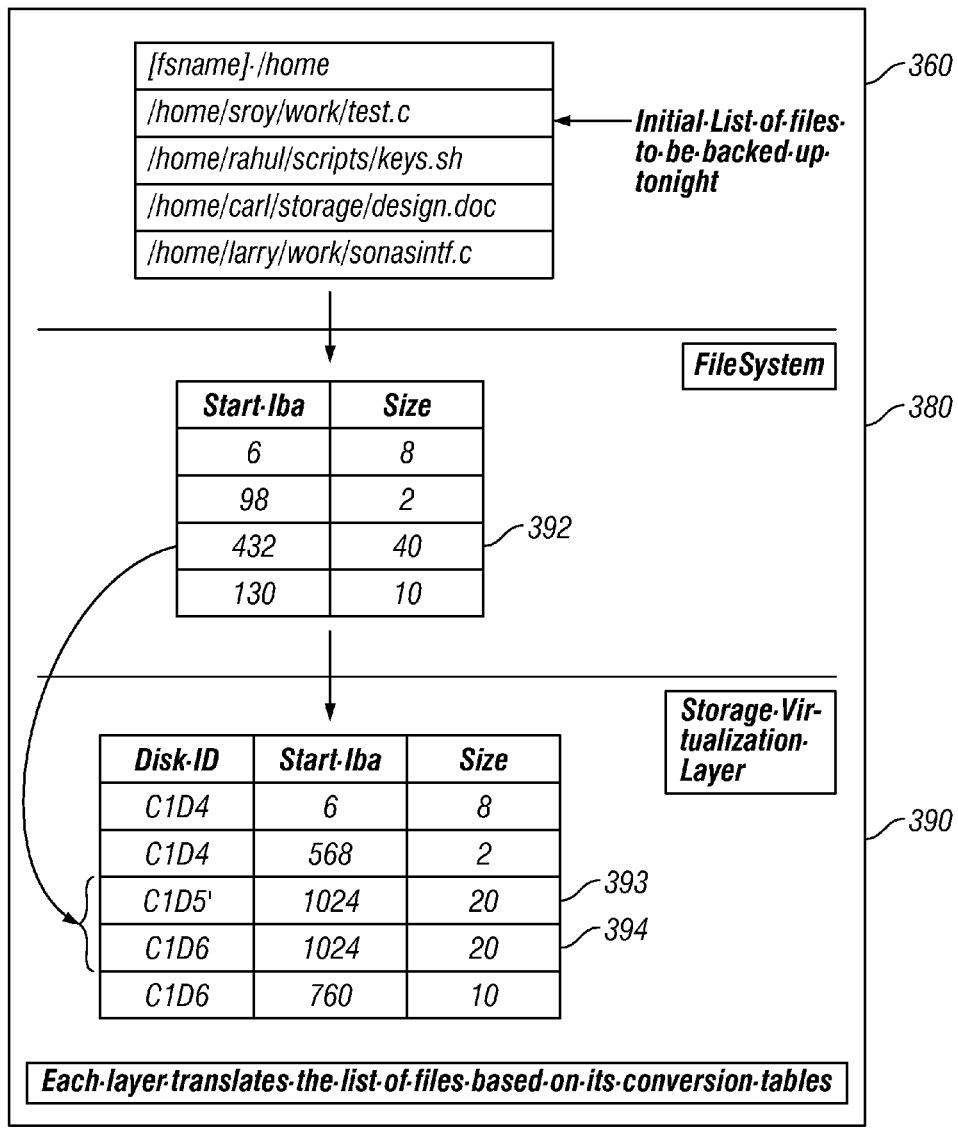
FIG. 3 is a diagrammatic illustration of a file system of FIG. 1 to be backed up.

Referring additionally to FIG. 3, at step 350, a backup session is scheduled for a lower usage period, such as at night, and a list of files or blocks 360 that will be accessed by the backup application is created by the backup application 320. The cache pollution reduction application 340, or an associated application, in step 370, before the backup starts, generates a complete list (or a subset, as long as the list is ahead of the current set of files or blocks to be backed up) of all the files or blocks that are to be read by the backup application 320 for a given session. The application generates the list by traversing the file tree in the same order as would be traversed by the backup application 320. In one example, the list 360 is a complete list of files or blocks in the file system if the backup is a full backup. In another example, the list 360 is a list of files or blocks that have changed since the last backup was taken if the backup is an incremental backup. Thus, in one embodiment, the identifying step 370 of the processor 212 identifies an advance subset of data stored in the data storage for backup. In one embodiment, the identifying step of the processor identifies a complete set of files of data stored in the data storage for the backup. In another embodiment, the portions of the backup and the marking step of the processor comprise data blocks. In the example of FIG. 3, the file names 360 to be backed up are translated to data blocks 380 with start logical block addresses and size in order for the lower levels of virtualization 390 to interpret the backup list and sequence of access.

Still in step 370, the list 360 is given to the to the file system by means of an API (application program interface). The file system may be a local file system of the application host 102 or processor 212 or be imported. An example of an API is API: prefetch(list of files, fsname).

The file system in turn takes the set of files and creates the list 380 that contains a list of block level READs that the file system will issue when the backup application starts. This list is sent to the underlying storage virtualization layer 390. In the example of FIG. 3, the files to be backed up in a given session are distributed over multiple disks, perhaps because the file system allocates free blocks according to its internal allocation algorithms, and each virtualization layer results in the list becoming longer due to the presence of RAID (redundant array of independent disks) conversion tables. As shown, file 392 is distributed over disks 393 and 394. For example, the list of 4 created at the file system layer gets converted to a longer list of 5 because part of the file is stored on one disk of a striped volume while the rest is stored on a separate disk of the same striped volume. The storage virtualization layer 390 may also reside in other areas, such as a LAN (Local Area Network) or WAN (Wide Area Network). For example, the data could be stored in cloud storage and be backed up to personal or less expensive cloud storage, or backed up to remote storage such as another storage system, etc.

For example, the virtualization layer converts the block level READs list to the corresponding list of physical disk blocks that are going to be READ by the backup application. This translation may be at stripe/mirror/RAID mappings used by the virtualization layer.

As the list percolates down the storage virtualization layers, each layer is aware of the exact pattern of access from the backup application. Thus, step 370 stores the list of blocks to be used later to pace the prefetch algorithm as well as to determine the discard process.

As the backup process starts 400, the prefetch API 330 prefetches data in step 410 as determined from the information of step 370, prefetching the data for the backup process in step 420. The data is handled in portions of data, examples of which are data blocks, or file system pages. Thus, herein, the terms "portions", "blocks", "pages", "subset", etc. are interchangeable. The storage system 110 caches the data to be backed up in step 420 to cache 218 (and to NVS 220 of the other server) and the backup process 320, in step 430, reads the data from cache and backs up the data to the backup data storage 310. The prefetch API in step 410 monitors the progress of the caching of step 420 and the backup of step 430 and paces the prefetches such that the reads to the backup data storage 310 can be satisfied from the cached data 218.

In step 440, as soon as the block of data is backed up to the backup data storage, the data block is marked for an accelerated LRU (least recently used) where the block of the data is discarded as soon as possible in step 450. For example, the block is identified from the list of step 370 as one that is to be discarded, and the identification is placed in an accelerated LRU list, "marked", in step 440. This ensures that the cache space can be quickly reclaimed in step 450 by the caching subsystem 218. Thus, upon backup of each portion of the identified data from the cache to the backup data storage, the processor 212 marks the backed up portion of the identified data for discard from the cache.

Thus, the backed up data is discarded from the cache right away, lessening cache pollution that otherwise would happen since the data was most recently accessed and a standard LRU algorithm would not be able to distinguish the fact that the blocks would not be accessed again, thus retaining them longer than their usefulness and causing resource issues.

As blocks are added to the to the accelerated LRU list on first access in step 440, subsequent files or portions of files as indicated by the prefetch list of step 370 are prefetched in step 410 into cache 218. The backup comprises a backup access pattern, and the processor 212 additionally prefetches the data blocks of the data storage for the backup for the caching in the order of the backup access pattern. The speed of the prefetch is calculated as a function of the bandwidth to the underlying storage system 203, 204 and the difference between the average disk access latencies versus memory 218 access latencies. This will ensure that the smallest subset of files is prefetched into the cache at any given time. The list of blocs provided by the file system in step 370 to the underlying storage control 200 thus allows a prefetch of a subset of blocks (a portion may be a block or subset) from physical disk to be cached.

The identifying step 370 of the processor 212 additionally comprises generating a list of physical block-level READs of the data stored in the data storage for the prefetching step 410 and for the marking step 440.

A person of ordinary skill in the art will appreciate that the embodiments of the present invention, disclosed herein, including the computer-implemented control 200 with processor(s) 212 for providing the backup of data for the system architecture 100 of FIG. 1, and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more non-transitory computer readable medium(s) having computer readable program code embodied thereon.

Any combination of one or more non-transitory computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for backing up data in a data storage system comprising primary data storage, cache, and backup data storage, the method comprising steps of:
identifying, in a list, portions of data stored in the primary data storage for backup to the backup data storage, the portions of data comprising subsets of data;
prefetching downward from the primary data storage the portions of data identified in the list;
caching the prefetched portions of data identified in the list in the cache;
backing up the prefetched portions of data identified in the list from the cache to the backup data storage; and
from the list, upon backup of each of the prefetched portions of data identified in the list from the cache to the backup data storage, marking each backed up portion of the prefetched portions of data identified in the list for accelerated Least Recently Used (LRU) discard from the cache;
wherein the backing up step and the marking step both comprise data blocks, and the backing up step comprises generating a backup access pattern, wherein the backup access pattern is generated from an exact pattern of access from a backup application, and the list is arranged in a same order specified by the backup access pattern such that the prefetching step prefetches, in the same order specified by the backup access pattern, data blocks of prefetched portions of data identified in the list for caching before backup to the backup storage.

2. The method of claim 1, wherein said identifying step identifies in said list an advance subset of data stored in said data storage for backup.

3. The method of claim 1, wherein said identifying step identifies in said list a complete set of files of data stored in said data storage for said backup.

4. The method of claim 1, wherein said identifying step additionally comprising generating said list of physical READs of said data stored in said data storage for said prefetching step and for said marking step.

5. A data storage subsystem comprising:
primary data storage;
cache;
backup data storage; and
at least one processor configured to perform steps of:
identifying, in a list, portions of data stored in the primary data storage for backup to the backup data storage, where the portions of the data comprise subsets of data, and where the portions of data identified in the list are prefetched downward from the primary data storage and cached in the cache;
backing up the prefetched portions of data identified in the list from the cache to the backup data storage; and
from the list, upon backup of each portion of the prefetched portions of data identified in the list from the cache to the backup data storage, marking each backed up portion of the prefetched portions of data identified in the list for accelerated Least Recently Used (LRU) discard from the cache;
wherein the backing up step and the marking step both comprise data blocks, and the backing up step comprises a backup access pattern, wherein the backup access pattern is generated from an exact pattern of access from a backup application, and the list is arranged in a same order of the backup access pattern such that the prefetching step prefetches, in the same order specified by the backup access pattern, data blocks of prefetched portions of data identified in the list for caching before backup to the backup storage.

6. The data storage subsystem of claim 5, wherein said identifying step of said processor identifies in said list an advance subset of data stored in said stat storage for backup.

7. The data storage subsystem of claim 5, wherein said identifying step of said processor identifies in said list a complete set of files of data stored in said data storage for said backup.

8. The data storage subsystem of claim 5, wherein said identifying step of said processor additionally comprises generating said list of physical READs of said data stored in said data storage for said prefetching step and for said marking step.

9. A computer program product for storing data with a data storage system comprising primary data storage; cache; backup data storage; and at least one computer-implemented processor, the computer program product comprising a non-transitory computer-usable storage medium having computer-usable program code embodied therein, the computer-usable program code comprising instructions to cause the processor to perform steps comprising:
identifying, in a list, portions of data stored in the primary data storage for backup to the backup data storage, where the portions of the data comprise subsets of data, and where the portions of the data identified in the list are prefetched downward from the primary storage and cached in the cache; and
backing up the prefetched portions of data identified in the list from the cache to the backup data storage; and
from the list, upon backup of each portion of the prefetched portions of data identified in the list from the cache to the backup data storage, marking each backed up portion of the prefetched portions of data identified in the list for accelerated Least Recently Used (LRU) discard from the cache;
wherein the backing up step and the marking step both comprise data blocks, and the backing up step comprises a backup access pattern, wherein the backup access pattern is generated from an exact pattern of access from a backup application, and the list is arranged in a same order of the backup access pattern such that the prefetching step prefetches, in the same order specified by the backup access pattern, data blocks of prefetched portions of data identified in the list for caching before backup to the backup storage.

10. The computer program product of claim 9, wherein said computer-usable program code for said processor identifying step comprises code to identify in said list a complete set of files of data stored in said data storage for said backup.

11. The computer program product of claim 9, wherein said computer-usable program code for said processor identifying step comprises code to identify in said list a complete set of files of data stored in said data storage for said backup.

12. The computer program product of claim 9, wherein said computer-usable program code for said processor identifying step additionally comprises code to generate said list of physical READs of said data stored in said data storage for said prefetching step and for said marking step.

\* \* \* \* \*